(No Model.)
G. W. MOLIERE.
CHECKREIN HOOK.
No. 404,643. Patented June 4, 1889.
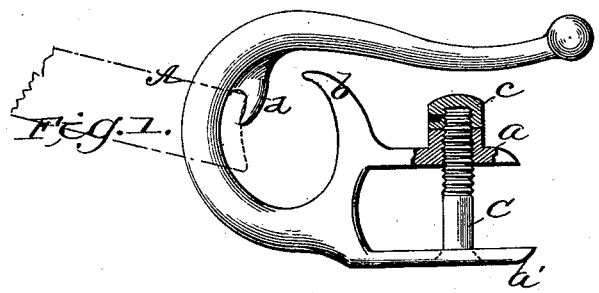
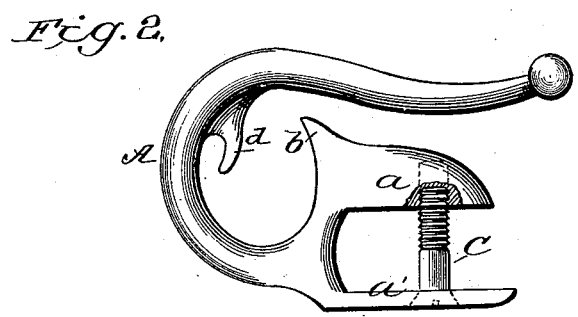
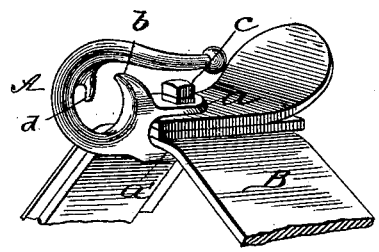

UNITED STATES PATENT OFFICE.

GEORGE W. MOLIERE, OF OCEAN VIEW, CALIFORNIA.

CHECKREIN-HOOK.

SPECIFICATION forming part of Letters Patent No. 404,643, dated June 4, 1889.

Application filed September 1, 1888. Serial No. 284,380. (No model.)

*To all whom it may concern:*

Be it known that I, GEORGE W. MOLIERE, of Ocean View, in the county of San Francisco and State of California, have invented a new and useful Improvement in Checkrein-Hooks, of which the following is a specification.

My invention consists in constructing a checkrein-hook with two parallel shanks, and in securing it to the harness-saddle by means of a screw, which passes through both shanks.

In the accompanying drawings, Figure 1 is a side view of my improved hook. Fig. 2 is a side view of a modification. Fig. 3 is a perspective view showing my improved hook applied to a harness-saddle.

The check or water hook A has two shanks $a\,a$, which are arranged parallel and separated by a space sufficient to receive between them the harness-saddle B, Fig. 3. The screw-bolt C, by which the hook is attached to the harness-saddle B, is inserted through a hole in the lower shank $a'$, and its head is countersunk therein so as to be flush with the latter.

As shown in Fig. 1, the threaded end of the bolt C passes through the upper shank $a$, and a nut $c$ is applied thereto. The nut is preferably provided with a lateral hole, as shown, to permit the application of pointed pliers or a wrench.

As shown in Fig. 2, a detachable nut is dispensed with, and the bolt C screws into a threaded bore or socket in the under side of the upper shank $a$, which therefore practically serves as a nut. In this case the head of the bolt has a nick to permit the application of a screw-driver. Thus in either case there is no projection on the under side of the shank, so that when the saddle-padding becomes compacted or worn the back of the horse is not chafed. A forwardly-projecting prong $b$ is formed at the junction of the upper shank with the hook proper A, and serves as a guard for preventing the checkrein from becoming accidentally detached from the hook. The nut $c$ also serves as a second guard.

The hook A is provided with a downwardly-projecting prong $d$, whose function is to catch over the checkrein and prevent it from sliding up on the hook, for otherwise the latter would be liable to be pulled or bent forward if the rein should be subjected to very strong tension when occupying the place of said prong $d$.

What I claim is—

As an improved article of manufacture, the checkrein-hook herein shown and described, consisting of the main part or hook proper A, having the two parallel shanks $a\,a'$ provided with coincident holes to receive the screw which attaches the device to a harness-saddle, as specified.

GEO. W. MOLIERE.

Witnesses:
HENRY BARTELS,
CHAS. WM. FRIEDRICHS.